(12) United States Patent
Hartel et al.

(10) Patent No.: US 8,190,461 B2
(45) Date of Patent: May 29, 2012

(54) LOGICALLY CENTRALIZED SCRAP MANAGEMENT USING PLANNING OPERATIONS

(75) Inventors: Michael Hartel, Heidelberg (DE);
Christian Fuhlbruegge, Spechbach (DE); Doris Karbach, Rauenberg (DE);
Nadine Sachs, Mannheim (DE); Sabine Worbs, Bruchsal (DE)

(73) Assignee: SAP AG, Walldorf (DE)

( * ) Notice: Subject to any disclaimer, the term of this patent is extended or adjusted under 35 U.S.C. 154(b) by 1437 days.

(21) Appl. No.: 11/738,110

(22) Filed: Apr. 20, 2007

(65) Prior Publication Data

US 2008/0262881 A1   Oct. 23, 2008

(51) Int. Cl.
*G06Q 10/00* (2012.01)
(52) U.S. Cl. ...................................... 705/7.12; 705/308
(58) Field of Classification Search .................. 705/7.12
See application file for complete search history.

(56) References Cited

U.S. PATENT DOCUMENTS

| | | | | |
|---|---|---|---|---|
| 5,930,156 | A | * | 7/1999 | Kennedy ........................... 703/6 |
| 6,144,893 | A | * | 11/2000 | Van Der Vegt et al. ....... 700/108 |
| 7,571,078 | B2 | * | 8/2009 | Chen et al. ........................ 703/2 |

OTHER PUBLICATIONS

Jordan, John; "Production Variance Analysis in SAP Controlling". Dec. 1, 2006. SAP Press. Chapter 5, pp. 73-92.*
Cunningham, James A.; "The Use and Evaluation of Yield Models in Integrated Circuit Manufacturing". May 1990. IEEE Transactions on Semiconductor Manufacturing. vol. 3, No. 2. pp. 60-71.*

* cited by examiner

*Primary Examiner* — Peter Choi
(74) *Attorney, Agent, or Firm* — Fish & Richardson P.C.

(57) ABSTRACT

The present disclosure relates to methods, systems, and software for processing or otherwise managing scrap information in a business application. For example, the software can instantiate a planning business object using production model data for production activities. The business object data and scrap information may be used to calculate requirements for a production planning model. The calculations may include adding an activity yield to activity scrap and fixed resource scrap to generate a component quantity. The component quantity can be multiplied by a component scrap ratio to generate additional component requirements. The component quantity may be added to the additional component requirements to determine a total quantity.

18 Claims, 7 Drawing Sheets

LOGICALLY CENTRALIZED SCRAP MANAGEMENT USING PLANNING OPERATIONS

TECHNICAL FIELD

This disclosure relates to inventory or production management and, more particularly, to systems and software implementing logically centralized scrap management.

BACKGROUND

Modern businesses typically employ software, such as an Enterprise Resource Planning ("ERP") program, that is configured to manage a portion or all of the business's inventory, production, sales, personnel, contacts, billing, and so forth. For example, a business may utilize such software to help manage production. Part of this management may include calculating and planning the scrap quantity that will result from production of an item, component, or kit. These scrap quantities can then be included in the planning run and in the calculation of production costs. In some existing software, three scrap calculations may be supported, namely assembly scrap (i.e., the scrap that results from the production of an assembly), component scrap (i.e., the scrap of a component that may break during production of an assembly), and operation scrap (i.e., faulty materials that were taken into account in assembly scrap may not be passed on to the next operation and instead removed). In certain cases, assembly scrap increases the order quantity of the assembly and subsequently increases the order quantity for corresponding components. The dependent requirements of the material components can therefore be increased correspondingly. With respect to component scrap, the dependent requirements can increase quantity of the component. If a scrap quantity was planned for a higher-level assembly, assembly scrap and component scrap are added to the component level. Operation scrap commonly refers to the quantity of one component that is to be processed in an operation such that the planning run is more exact and service and quantity consumption can be determined more precisely. If the component is contained in an assembly, for which an assembly scrap quantity has been maintained, the system may only take the operation scrap into account.

SUMMARY

The present disclosure relates to methods, systems, and software for processing or otherwise managing scrap information in a business application. The scrap information may include activity scrap, fixed resource scrap, and component scrap. The software can be operable to instantiate a planning business object using production model data for production activities. The business object data and scrap information may be used to calculate requirements for a production planning model. The calculations may include adding an activity yield to activity scrap and fixed resource scrap to generate a component quantity. The component quantity can be multiplied by a component scrap ratio to generate additional component requirements. The component quantity may be added to the additional component requirements to determine a total quantity. Requirements may be calculated for various activities and can include an activity duration. The duration can be calculated by multiplying the component quantity and the duration per component. The calculation of the requirements may include calculating each requirement for each activity beginning after a process has begun.

The software may be further operable to perform one or more scrap checks during initialization of the planning business object. The scrap check may include identifying the component scrap from a material master object if a particular bill of material object does not store the component scrap. In some cases, the scrap check may include converting a unit of measure for the fixed resource scrap if the fixed resource scrap unit of measure does not match a unit of measure of the particular component for the activity.

Moreover, some or all of these aspects may be further included in respective systems or other devices for executing, implementing, or otherwise managing scrap information. The details of these and other aspects and embodiments of the disclosure are set forth in the accompanying drawings and the description below. Other features, objects, and advantages of the various embodiments will be apparent from the description and drawings, as well as from the claims.

DETAILED DESCRIPTION

Figure 1:
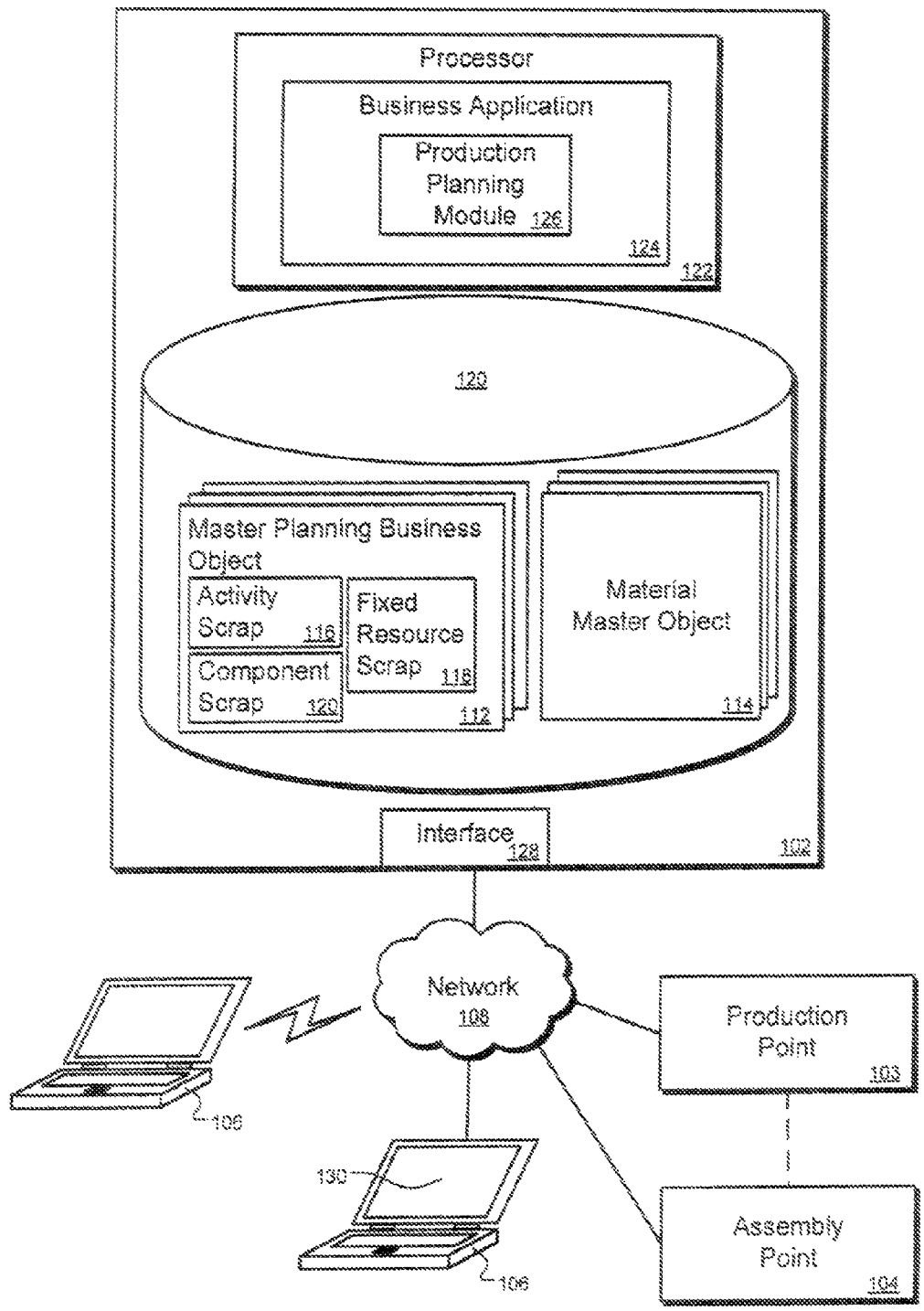
FIG. 1 illustrates an example system for managing scrap information in accordance with one implementation of the present disclosure.

The present disclosure relates to methods, systems, and software for processing or otherwise managing scrap information in a business application. Such business applications can utilize many different components, distributed across many different hardware platforms, possibly in several different geographical locations. For example, this business software may be designed to utilize business objects. Business objects are typically objects in an object-oriented computer program that encapsulate various business-related tasks. For example, an inventory program may employ business objects to represent warehouses, sources of supply, vendors, items, and the like. Typically, business objects encapsulate all of the data and behavior associated with the business process or entity that it represents. For example, a business object may be responsible for loading an order from a database, modifying any data associated with that order, and then saving the order back to the database. Utilizing business objects to help manage scrap information helps provide better possible coverage of the requirements of manufacturing business.

Specifically, scrap information can be mapped (e.g., accounted for in a business model) into scrap related to assembly, production, operations, resources, and other business activities. In general, the scrap information may be mapped and maintained in the business application. This business application may use various models to apply planning and costing functionalities to scrap quantities. For example, the business application may use scrap information and a master planning business object to dynamically calculate production planning requirements that reflect the assignment of scrap to a particular product or assembly. In some cases, the mapping process may provide the ability to include scrap costs in a material requirements document (e.g., bill of material) for a particular product or assembly. As such, the entire cost of creating and/or assembling a product and the amount of scrap product created can be determined and stored in a material master object. The material master object generally includes basic information used to manage a particular material. The data may be of a descriptive nature (e.g., size, dimension, weight, etc. and data with a control function (e.g., material type, industry sector, etc.). Moreover, such functionality may be used on scrap information to determine excess consumption of materials and services. In particular, the business application can automatically add scrap information to a set of material requirements for a production order proposal, for example.

The business application 124 may also employ a scrap management system able to generally outline system procedures in materials planning which can account for, and plan some or all future requirements during the creation of order proposals (e.g., independent requirements, dependent requirements, and so on). The scrap management system may instantiate business objects and models in order to calculate requirements for production planning and to release scrap information or other documents. In short, while generally described as business application 124, the scrap management system may include any tool, application programming interface (API), application, or environment that allows a user to modify, configure, and utilize the stored scrap information and related data. In certain cases, the production planning system may provide on-demand cross-organizational capabilities, such as virtual networks of business partners who can obtain visibility of scrap quantities across a whole supply chain.

In some embodiments, the techniques and components in this disclosure may operate independent of their calling software applications. As such, messaging, updates, and document exchanges can be performed synchronously or asynchronously using eXtensible Markup Language ("XML") documents, Virtual Storage Access Method ("VSAM") files, flat files, Btrieve files, comma-separated-value ("CSV") files, or user interfaces. Document exchanges, such as scrap reports, may be received or retrieved in an interface internally (e.g., production planning module) or externally (e.g., production or assembly site). In some embodiments, the inventory management system can receive an XML document containing a stock modification (e.g., a physical movement of inventory) directly from an external interface Turning to FIG. 1, an example scrap management system 100 for calculating production planning requirements using business data and scrap information is illustrated. When appropriate, the system may utilize a production planning module 126 to map production scrap to the appropriate business objects (e.g., master planning business object 112) or other business entity. The system 100 includes a server 102 for managing the business objects and applications that host scrap information details. The server 102 can typically be accessed in a stand-alone fashion (such as a website), within any suitable productivity tool (whether enterprise software, email application, and others) selected by the user or automatically interfaced, or in a cooperative fashion with a third party search engine. In other words, system 100 may manage and share a knowledge base of software assets or other data services (often using metadata) that can easily be integrated into different developer and end user tools.

System 100 is typically a distributed client/server system that spans one or more networks such as network 108. As described above, rather than being delivered as packaged software, system 100 may represent a hosted solution, often for an enterprise or other small business that may scale cost-effectively and help drive faster adoption. In this case, portions of the hosted solution may be utilized by a first entity, while other components are utilized by a second entity. Moreover, the processes or activities of the hosted solution may be distributed amongst these entities and their respective components as well as other business partners in the supply chain. In some embodiments, system 100 may be in a dedicated enterprise environment—across a local area network or subnet—or any other suitable environment without departing from the scope of this disclosure.

Turning to the illustrated embodiment, system 100 includes or is communicably coupled (such as via a one-, bi- or multi-directional link or network) with server 102, production point 103, assembly point 104, and one or more clients 106, at least some of which communicate across network 108. Server 102 comprises an electronic computing device operable to receive, transmit, process, and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer ("PC"), Macintosh, workstation, Unix-based computer, or any other suitable device. In other words, the present disclosure contemplates computers other than general purpose computers as well as computers without conventional operating systems. Server 102 may be adapted to execute any operating system, including Linux, UNIX, Windows Server, or any other suitable operating system. According to one embodiment, server 102 may also include or be communicably coupled with a web server and/or a mail server.

Illustrated server 102 often includes local memory 110. Memory 110 may include any memory or database module and may take the form of volatile or non-volatile memory including, without limitation, magnetic media, optical media, random access memory (RAM), read-only memory (ROM), removable media, or any other suitable local or remote memory component. Illustrated memory 110 includes a master planning business object 112 and a material master object 114. But memory 110 may also include any other appropriate data such as HTML files or templates, messages, data classes or object interfaces, unillustrated software applications or sub-systems, and others. Consequently, memory 110 may be considered a repository of data, such as a local scrap information repository for one or more applications.

Master planning business object 112 may generally represents a logically centralized object for storing and/or managing scrap information. Often, this business object is executed (or invoked) and may represent a scrap document or link including the scrap information for one or more components. In this fashion, multiple implementations or instances of the particular or similar business objects may reference or link to the scrap document. As shown in FIG. 1, the master planning business object 112 includes or references data structures for activity scrap 116, fixed resource scrap 118, and component scrap 120. The various scrap types may provide information for system 100 such that the system may dynamically calculate production requirements (e.g., materials, labor, and other activities) for a business application 124, for example. Activity scrap 116 represents a total of possible variable, causally indistinguishable scrap arising from one stage of production. For example, one activity (e.g., component placement, board assembly, and such) may produce a known level of activity scrap 116 each time the activity is performed. Fixed resource scrap 118 represents scrap that arises when a machine produces a set number of rejected items, regardless of a run quantity. For example, fixed resource scrap may arise out of tooling and setup activities for a product or assembly. Component scrap 120 may be used to record scrap from production of a particular component in an assembly. It may cause an increase in component requirement quantities, but generally does not impact production time or resource consumption. In some embodiments, the component scrap 120 is defined in the bill of material for a particular assembly. The component scrap 120 may provide details about how much scrap is expected for the mounting of the assembly.

Although only three types of scrap are depicted, master planning business object 112 may include any or all scrap information according to accounting records. In some embodiments, the master planning business object 112 may also include assembly scrap and other types of scrap as deemed usable by the system 100. Assembly scrap is an approximate value for the quantity of assemblies rejected. Further, assembly scrap is generally not entered manually, but is instead calculated as the arithmetic mean of activity scrap 116. Assembly scrap may be recorded and stored for pricing and controlling purposes in the system.

In general, the scrap "type" can be assigned according to which activity, material, or process produces the scrap. In one embodiment, the material master object 114 may assign the scrap type. The material master object 114 may represent a data record containing basic information required to manage a material. This data can be sorted according to various criteria. In addition to this data, the material master object 114 may include data that is automatically updated by the system (such as stock levels). The material master object data can be directly maintained by a user at the production point 103, or the assembly point 104, or another client 106 of the system 100.

In this disclosure, the term "material" represents a tangible product such as a sellable article, packaging, auxiliary material or expendable supplies. As such, the material master object 114 may include a description for any or all of the aforementioned materials. Similarly, the term "product" represents a commodity that is the object of the business of a company and serves to create value for this company. A product can be tangible or intangible. A product can have relationships to other products or objects.

Scrap material can generally be created at a production point 103 and an assembly point 104. The production point 103 can house tools, equipment, and operators to transform raw materials into finished components. Similarly, assembly point 104 may create scrap while assembly finished goods and products. In general, the production point 103 may receive a bill of material to create a product. The bill of material may include a structured list that defines and describes the components that are used in the production of a material or product. In some embodiments, the expected scrap values for fixed resource scrap 118 can be included in the bill of material. The assembly point 104 may receive instructions from the production point 103. For example, the bill of material may be electronically transferred from point to point to ensure proper build instructions and updated scrap quantities.

In some embodiments, production point 103 and assembly point 104 may be internal or external to a company and may be located in the same area or building. For example, a third-party manufacturing site may have both a production point 103 and an assembly point 104 to carry out operations. In other embodiments, the production point 103 may be at a separate facility that the assembly point 104. In operation, the production point 103 and assembly point 104 may create scrap information internally or externally. The scrap information can be transferred between production 103 and assembly 104, and further may be transferred to any or all of server 102, or client 106, for example.

Returning to server 102, it also includes processor 122. Processor 122 executes instructions and manipulates data to perform the operations of server 102 such as, for example, a central processing unit ("CPU"), a blade, an application specific integrated circuit ("ASIC"), or a field-programmable gate array ("FPGA"). Although FIG. 1 illustrates a single processor 122 in server 102, multiple processors 122 may be used according to particular needs and reference to processor 122 is meant to include multiple processors 116 where applicable. In the illustrated embodiment, processor 122 executes or requests execution of at least business application 124, and production planning module 126.

The techniques and components described herein may be implemented within an enterprise resource computing system, such as business application 124. At a high level, business application 124 is any application, program, module, process, or other software that may change, delete, generate, or otherwise manage scrap information according to the present disclosure. The business application 124 may be stored in a nonvolatile storage location, such as a distributed storage device or other repository (perhaps exterior to the server 102) and (some or all) be transferred to memory 110 for active use by the system 100. Memory 110 may include, point to, reference, or otherwise store business data used by the business application 124 or the production planning module 126. In certain cases, system 100 may implement a composite application 124. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Application 124 may be a child or sub-module of another software module or enterprise application (not illustrated) without departing from the scope of this disclosure. Indeed, application 124 may be a hosted solution that allows multiple parties in different portions of the process to perform the respective processing. For example, client 106 may access application 124 on server 102, or even as a hosted application located over network 108 without departing from the scope of this disclosure.

More specifically, business application 124 may be a composite application, or an application built on other applications, that includes an object access layer (OAL) and a service layer. In this example, application 124 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 124 to orchestrate a business process in synchronization with other existing processes (e.g., native processes of enterprise base systems) and leverage existing investments in the IT platform. Further, composite application 124 may run on a heterogeneous IT platform. In doing so, composite application 124 may be cross-functional in that it may drive business processes across different applications, technologies, and organizations. Accordingly, composite application 124 may drive end-to-end business processes across heterogeneous systems or sub-systems. Application 124 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 124, it may instead be a standalone or (relatively) simple software program. Regardless, application 124 may also perform processing automatically, which may indicate that the appropriate processing is substantially performed by at least one component of system 100. It should be understood that this disclosure further contemplates any suitable administrator or other user interaction with application 124 or other components of system 100 without departing from its original scope. Finally, it will be understood that system 100 may utilize or be coupled with various instances of business applications 124. For example, client 106 may run a first business application 124 that is communicably coupled with a second business application 124. Each business application 124 may represent different solutions, versions, or modules available from one or a plurality of software providers or developed in-house. In some instances, multiple business applications 124 may request scrap calculations to be performed in parallel using the same production planning module 126.

At a high level, production planning module 126 is any application, program, module, process, or other software that may instantiate a logically centralized master planning business object using production model data for an activity and calculate production planning requirements, such as materials, resources, and expected scrap, from the data. More particularly, the production planning module 126 can be generated from a production model to release production data (e.g., materials, scrap, activities, operations, and so forth) for planning purposes. The production planning module 126 may include production bill of operations data and production bill of material data used for the planning of production processes. The production planning module 126 may be used to create production planning orders including scrap information for each order. In particular, the production planning module 126 may calculate requirements for the production planning model using master planning business object 112 and scrap information (116, 118, and 120). Further details regarding the production planning module 126 will be described with respect to FIGS. 2A-2C.

Server 102 may also include interface 128 for communicating with other computer systems, such as clients 106, over network 108 in a client-server or other distributed environment. In certain embodiments, server 102 receives data from internal or external senders through interface 128 for storage in memory 110 and/or processing by processor 122. Generally, interface 128 comprises logic encoded in software and/or hardware in a suitable combination and operable to communicate with network 108. More specifically, interface 128 may comprise software supporting one or more communications protocols associated with communications network 108 or hardware operable to communicate physical signals.

Network 108 facilitates wireless or wireline communication between computer server 102 and any other local or remote computer, such as clients 106. Network 108 may be all or a portion of an enterprise or secured network. In another example, network 108 may be a VPN merely between server 102 and client 106 across wireline or wireless link. Such an example wireless link may be via 802.11a, 802.11b, 802.11 g, 802.20, WiMax, and many others. While illustrated as a single or continuous network, network 108 may be logically divided into various sub-nets or virtual networks without departing from the scope of this disclosure, so long as at least portion of network 108 may facilitate communications between server 102 and at least one client 106. For example, server 102 may be communicably coupled to one or more "local" repositories through one sub-net while communicably coupled to a particular client 106 or "remote" repositories through another. In other words, network 108 encompasses any internal or external network, networks, sub-network, or combination thereof operable to facilitate communications between various computing components in system 100. Network 108 may communicate, for example, Internet Protocol ("IP") packets, Frame Relay frames, Asynchronous Transfer Mode ("ATM") cells, voice, video, data, and other suitable information between network addresses. Network 108 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations. In certain embodiments, network 108 may be a secure network associated with the enterprise and certain local or remote clients 106.

Client 106 is any computing device operable to connect or communicate with server 102 or network 108 using any communication link. For example, client 106 is intended to encompass a personal computer, touch screen terminal, workstation, network computer, kiosk, wireless data port, smart phone, personal data assistant ("PDA"), one or more processors within these or other devices, or any other suitable processing device. At a high level, each client 106 includes or executes at least GUI 130 and comprises an electronic computing device operable to receive, transmit, process, and store any appropriate data associated with system 100. It will be understood that there may be any number of clients 106 communicably coupled to server 102. Further, "client 106," "business partner," and "user" may be used interchangeably as appropriate without departing from the scope of this disclosure. Moreover, for ease of illustration, each client 106 is described in terms of being used by one user. But this disclosure contemplates that many users may use one computer or that one user may use multiple computers. For example, client 106 may be a PDA operable to wirelessly connect with an external or unsecured network. In another example, client 106 may comprise a laptop that includes an input device, such as a barcode scanner, RFID scanner, keypad, touch screen, mouse, or other device that can accept information, and an output device that conveys information associated with the operation of server 102 or clients 106, including digital data, visual information, or GUI 130. Both the input device and output device may include fixed or removable storage media such as a magnetic computer disk, CD-ROM, USB drive, or other suitable media to both receive input from and provide output to users of clients 106 through the display, namely the client portion of GUI or application interface 128.

GUI 130 comprises a graphical user interface operable to allow the user of client 106 to interface with at least a portion of system 100 for any suitable purpose, such as viewing application, inventory, or other transaction data. Generally, GUI 130 provides the particular user with an efficient and user-friendly presentation of data provided by or communicated within system 100. For example, GUI 130 may present the user with the components and information that is relevant to their task, increase reuse of such components, and facilitate a sizable developer community around those components. GUI 130 may comprise a plurality of customizable frames or views having interactive fields, pull-down lists, and buttons operated by the user. For example, GUI 120 is operable to display certain data services in a user-friendly form based on the user context and the displayed data. In another example, GUI 130 is operable to display different levels and types of information involving data services based on the identified or supplied user role. GUI 130 may also present a plurality of portals or dashboards. For example, GUI 130 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by data services. It should be understood that the term graphical user interface may be used in the singular or in the plural to describe one or more graphical user interfaces and each of the displays of a particular graphical user interface. Indeed, reference to GUI 130 may indicate a reference to the front-end of production planning module 126, as well as the particular interface accessible via client 106, as appropriate, without departing from the scope of this disclosure. Therefore, GUI 130 contemplates any graphical user interface, such as a generic web browser or touchscreen, that processes information in system 100 and efficiently presents the results to the user. In some embodiments, server 102 can accept data from client 106 via the web browser (e.g., Microsoft Internet Explorer or Mozilla Firefox) and return the appropriate HTML or XML responses to the browser using network 108.

Figure 2A:
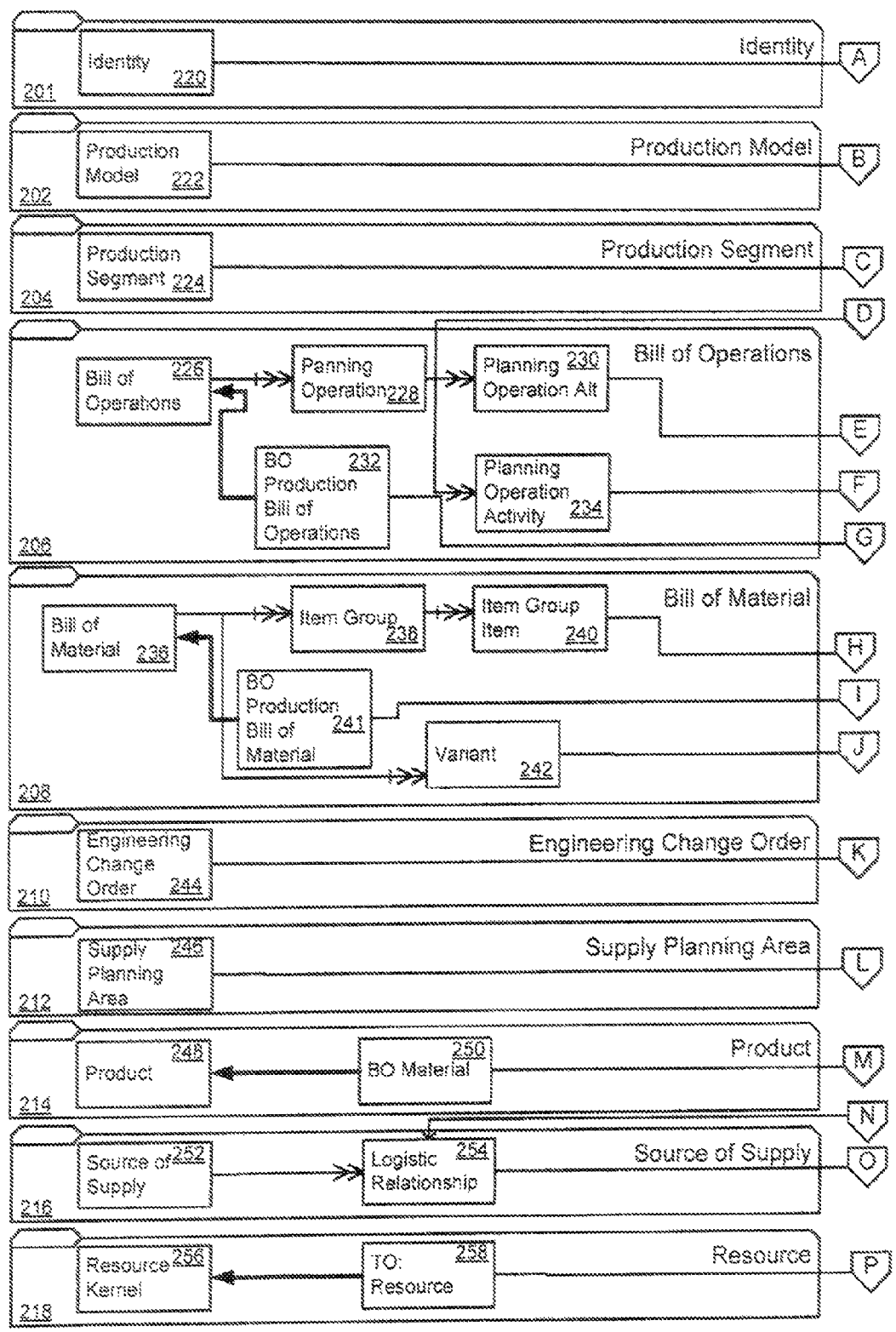
FIGS. 2A-C illustrate an example production planning module and associated components.
Figure 2B:
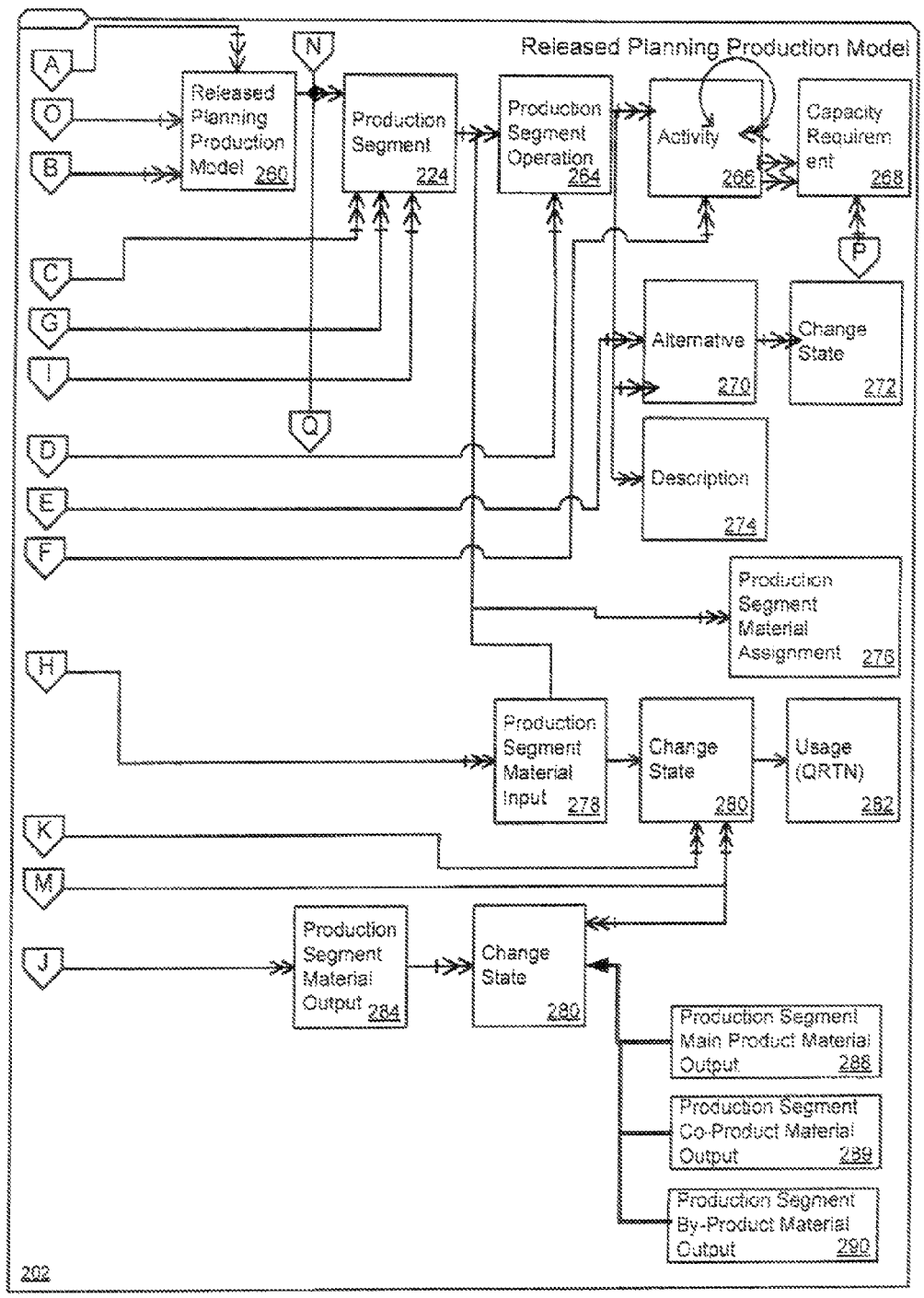
Figure 2C:
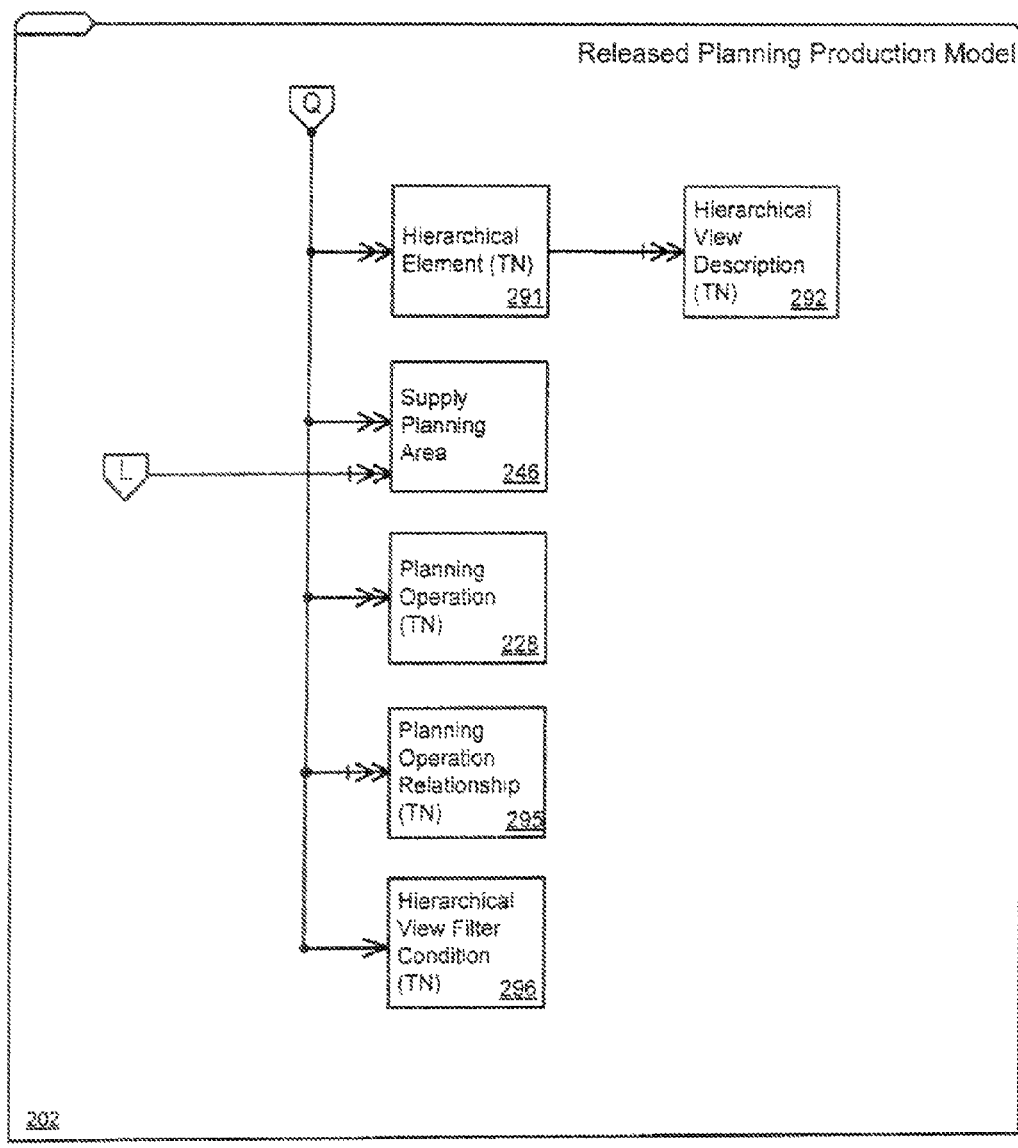

FIGS. 2A-C illustrate example business objects that may be utilized by the production planning module 126. In short, the production planning module 126 is an engine used for planning production processes. Planning may include activities for creating a master plan for a material, product, assembly, or other process related output. Various strategies may be used for planning activities. For example, the production planning module 126 may plan for make-to-stock production, planning including final assembly, planning without final assembly, planning with planning material, planning at assembly level, production by lot size for sales or stock orders, make-to-order production, and others. The planning process may also account for scrap production. For example, the production planning module 126 may implement various calculations to plan for expected scrap (e.g., activity scrap 116, fixed resource scrap 118, and component scrap 120). In particular, a "scrap factor" may be calculated during scheduling of a routing using the operations in the routing and then written to the material master object 114. Thus, an operator or other system user can use the scrap factor information to attain a precise cost and/or material requirement for the production of the item. The planned scrap can be component-based or operation-based.

The production planning module 126 may utilize various business objects such as master planning business subject 112. One implementation of such a logically centralized master planning business subject 112 is production model 202, which helps manage the production plan for expected scrap, materials, resources, activities, tooling, and such. The production model is generally based on the bill of material and the routing in an enterprise resource planning system 100. The production model 202 can determine the flow of materials and the necessary capacity profiles. In some embodiments, several production models can exist for one product. In general, the production model 202 may be split into various production segments 204. Each production segment 204 includes bill of operations information from a production bill of operations 206 and bill of material information from a production bill of material 208. The production model 202 may also include an engineering change order, a supply planning area 212, a product 214, a source of supply 216, and a resource 218. The activities planned and performed in the above model 202 may produce scrap information, such as quantities of unusable material or product. In operation, the production planning module 126 may calculate and map this scrap information into business objects (e.g., master planning business object 112) according to scrap types such as, activity scrap 116, fixed resource scrap 118, component scrap 120, and in some cases assembly scrap. Overall, the calculations can be carried out by the production planning 126 according to the production model 202.

Turning to the illustrated embodiment, an identity package 201 includes an identity BO 220 that represents a combination of all user accounts of a person, document, or entity in a system landscape. It may also contain settings for system access and the associated user rights and restrictions.

The production model package includes a production model BO 222 that represents a production process in a production point 103 that may be defined by a network of production segments 204. The production segment package 204 includes a production segment BO 224 that represents a part of a production process in a production point 103 specified by a network of operations and assigned materials for the production of a material.

The bill of operations package 206 includes a bill of operations BO 226, a planning operation BO 228, a planning operation alternative BO 230, a BO Production bill of operations 232, and a planning operation activity BO 234. In general, information can be passed from the bill of operations BO 226 to the planning operation BO 228 on to the planning operation alternative BO 230.

In some embodiments, the component scrap may be managed in the bill of material 208 and may indicate how much scrap is expected for the mounting of a particular assembly. The bill of material package 208 includes a bill of material BO 236, an item group BO 238, an item group item BO 240, a BO production bill of material 241, and a variant BO 242. In general, the bill of material BO 236 may pass information into the item group BO 238 and the variant 242. The item group 238 may pass information to the planning operation alternative BO 230.

The engineering change order BO 210 represents a set of instructions to make changes to a number of objects from the areas of engineering or production. The supply planning area BO 212 groups requirements, stocks and other requirements coverage elements with the purpose of being together taken into account in net requirements calculation of supply planning. The product package 214 includes a product BO 248 and a BO material 250. The source of supply package 216 includes a source of supply BO 252 and a logistic relationship BO 254. In general, the source of supply BO 252 may pass information to the logistic relationship BO 254. The resource kernel package 218 includes a resource kernel BO 256 and a resource BO 258. Several off-page connectors are shown in FIG. 2A and will be discussed with reference to FIGS. 2B and 2C.

Referring to FIG. 2B, the released planning production model is illustrated with several business objects. The business objects include a released planning production model BO 260, the production segment BO 224, a production segment operation BO 264, an activity BO 266, a capacity requirement BO 268, an alternative BO 270, a change state BO 272, a description BO 274, a production segment material assignment BO 276, a production segment material input BO 278, a change state BO 280, a Usage BO 282, a production segment material output BO 284, a production segment main product material output 288, a production segment co-product material output BO 289, and a production segment by-product material output BO 290.

As indicated by off-page connectors A, O, and B, the released planning production model BO 260 may receive input from the production model BO 202, the identity BO 220, and the logistic relationship BO 254. For example, preliminary production planning information is used to create the released planning production model 202. The released planning production model BO 260 may send information into the production segment BO 224. As shown by off-page connectors C, G, and I, production segment BO 224 may receive information from the BO production bill of operations 232 and the BO production bill of material 241.

The production segment BO 224 may send information into the production segment operation BO 264, the production segment material assignment BO 276, and the production segment material input BO 278. The production segment operation BO 264 may receive information from the planning operation activity BO 234 as well as send (off-page connector D) information to the business object 234. The production segment operation BO 264 may send information into the activity BO 266, the alternative BO 270, and the description BO 274. The activity BO 266 can receive information from the planning operation activity 234.

The activity BO 266 may send information to itself and into the capacity requirement BO 268. The capacity requirement BO 268 may send information to the resource BO 258 (off-page connector P) which can then be sent to the resource kernel BO 256. The resource BO 258 may also respond to the capacity requirement BO 268.

As indicated by off-page connector E, the alternative BO 270 may receive information from the planning operation alternative BO 230 in the bill of operations package 206. The alternative BO 270 may send information to the change state BO 272 to change the state of a bill of operations.

The production segment material input BO 278 may receive (off-page connector H) information from the item group item BO 240. The production segment material input BO may pass the information to the change state BO 280. BO 280 may send the information to the usage BO 282. The change state BO 280 may also receive input from the engineering change order BO 244 (off-page connector K) and the BO Material 250 (off-page connector M).

The production segment material output BO 284 may send information to the change state BO 280. The change state BO 280 can receive information from the production segment main production material output BO 288, the production segment co-product material output BO 289 and the production segment by-product material output BO 290. As indicated by off-page connector N, the production segment BO 224 may send information to logistic relationship BO 254.

Referring to FIG. 2C, the released planning production model 202 further includes several business objects that can receive data from the logistic relationship BO 254 (FIG. 2A, off-page reference Q). The business objects include a hierarchical element BO 291 that can send information to a hierarchical view description BO 292, the supply planning area BO 246 (connected by off-page reference L), the planning operation BO 228, a planning operation relationship 295, and a hierarchical view filter condition BO 296.

Figure 3:
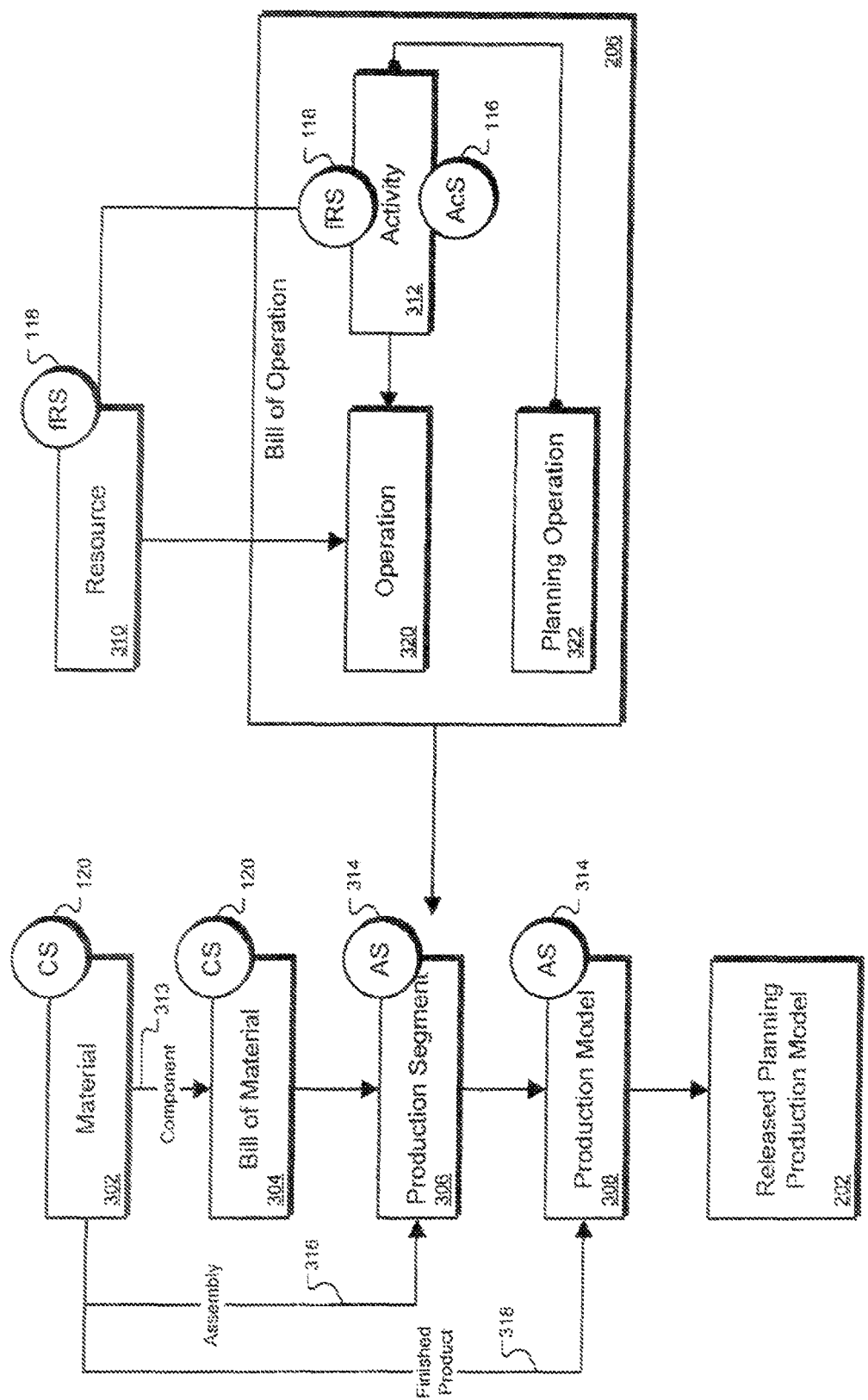
FIG. 3 illustrates components for assigning scrap in various business objects in accordance with one implementation of the present disclosure.

At a high level, FIG. 3 illustrates components for assigning scrap in various business objects according to one implementation. The business objects may represent various entities within a production model. As shown, the business objects (BO) include a material BO 302, a bill of material BO 304, a production segment BO 306, a production model BO 308, a resource BO 310, and an activity BO 312. In some cases, scrap information can be stored in other business objects in the system including master planning BO 112 and material master object 114.

The material BO 302 represents a product such as a sellable article, packaging, auxiliary material, or expendable supplies. The product represents a tangible or intangible commodity that is the object of the business of a company and serves to create value for this company. The product can contain other products, or belong to another product, for example. In some embodiments, the product can have relationships to other products or objects.

The bill of material BO 304 represents a complete and structured list that defines and describes the components that are required in the production of a material or family of similar materials. The list may include the object number of each component, together with the quantity and unit of measure.

The production segment BO 306 represents part of a production process in a production center specified by a network of operations and assigned materials for the production of a material. The production segment BO 306 may include application data for a business document (e.g., scrap information). The production model BO 308 is generally defined as a model of a production process in a production center that is defined by a network of production segments.

The resource BO 310 represents an asset that contributes to the sourcing, production or delivery of a product. For example, the resource may be a user or tool involved in a production process that have capacities allocated to them. Resources can be subdivided into resource categories, such as production line, labor, and storage to name a few examples.

The activity BO 312 represents a structured view of activities of various types in order to plan and document all actions and interactions related to business partners. For example, the activity BO 312 may include some or all of the process steps for executing an operation, such as setup, process, tear down, and wait. In some embodiments, the activity may represent a separate step within an operation.

Each of the above described business objects can store scrap information. As such, the type of scrap may determine which business object receives the scrap information. Referring to FIG. 3, the process illustrated depicts component scrap (CS) 120 assigned to the material BO 302. For simplicity, the component scrap 120 may be recorded in the material BO 302 independent of the related bills of material. The component scrap 120 that can be stored in the material BO 302 may also be applied to any or all bills of material for the material concerned. Accordingly, FIG. 3 illustrates the material as a component (arrow 313) of the bill of material and further indicates the component scrap 120 in the bill of material BO 304. In some embodiments, when component scrap information is added to a particular bill of material, the information may override current component scrap stored in the material master object 114.

Some or all of the bill of material BO 304 information may be provided to the production segment BO 306. A portion of the information may include assembly scrap information. In general, assembly scrap (AS) 314 is automatically determined as the arithmetic mean of the activity scrap and is, thus, not typically included in planning scrap determination. For example, the production segment 306 may have assembly scrap 306 assigned to and may include several production processes to which assembly scrap 314 can be assigned. The assembly scrap 314 is generally expressed as percentage of the total assembly quantity for this production segment. As shown by arrow 316, the production segment BO 306 may receive assembly information from the material BO 302. Similar to the production segment BO 306, the production model BO 308 can be assigned assembly scrap information 314 that has been automatically determined. Additionally, the production model BO 308 may receive finished product information (arrow 318) from the material BO 302. The finished product information can be used to calculate scrap values for one or more activities. In this case, assembly scrap information 314 is normally expressed as a percentage of the total quantity of the finished product and is determined as the arithmetic mean of the production segment assembly scrap.

Fixed resource scrap (depicted as fRS) 118 may be assigned to the resource BO 310. In some embodiments, fixed resource scrap may alternatively be assigned to an activity in the bill of operation. The scrap assignment includes both the number of scrap parts and the unit of measure. The fixed resource scrap 118 generally relates to the resource that is assigned. The assignment may be included in the resource BO 310 if the resource (e.g., material or activity) is typically used to make the same product and the amount of resource scrap may be fixed (e.g., approximately the same each build). In some embodiments, fixed resource scrap 118 is assigned in relation to activities that process a material if the activity is preceded by a setup activity. Moreover, resource scrap relating to an activity may override resource scrap related to the resource business object 310

In some embodiments, different materials may be assigned with different numbers of fixed scrap items, depending on the physical properties of the materials. In such cases, a user may set resource scrap in relation to an activity on a bill of operation (e.g., routing) for the production of the material. Moreover, if it is known what components the activity processes, the properties of the material can be allowed for in the scrap calculation.

The activity BO 312 may be assigned fixed resource scrap 118 and activity scrap (depicted as AcS) 116. Activity scrap 116 is assigned to the production activity in relation to which it arises. In particular, the activity scrap 116 may be expressed as a percentage of a total activity quantity in the activity business object 312. Illustrated activity BO 312 is included in the bill of operation 206. The bill of operation 206 includes one or more operations 320 and one or more planning operations 322. The operations 320 describe one or more actions within a production plan. For example, an operation can include any number of assembly, production, inspection, network, or other office actions. The planning operations 322 may be an independent part of a set of operations executed on a processing unit. As shown in FIG. 3, activities generally have a material flow indicator from planning operation 322 to performing the operation 320. The flow can be set to illustrate whether the quantities produced go onto a follow-on activity downstream or into inventory.

The scrap data stored in any or all of the above business objects can be used to create a released planning production model 202. The released planning production model 202 represents a released version of a production model that can include the production bill of operations and production bill of material data used in the planning of a production process. The production planning activities may be generated from a production model 202 to release the production plan for expected scrap, materials, resources, activities, tooling, and such. The production planning module 126 may implement a planning production model 202.

In operation, the system 100 may provide planning for production processes. The planning process may be triggered by creating a production planning order for a defined product and a defined quantity. For subsequent planning, the production planning order may use information that is collected in a particular released planning production model 202 assigned to the product. When requested by a system user, the released planning production model 202 is exploded by calculation of the input component quantities and time and resource reluriemtns, based on the process yield. Scrap calculations can be included in this calculation operation.

In general, production planning module 126 may calculate the scrap values for some or all activities in a particular bill of operation. For example, production planning module 126 may calculate the activity scrap 116 and then calculate the fixed resource scrap using the activity scrap as input. In some cases, the scrap information can be stored in the selected business object as percentages. The stored percentages generally apply to the total of all materials made during a stage of production.

The calculation explosion discussed above includes calculating component quantities to be processed in each of the activities. The component quantities may be the component input quantities used to obtain a yield for the next activity. Calculations may begin when the finished product yield is received (318) in the production model 308 and or obtained in the system 100. The activity used in the calculations may pertain to the process sequence to which the finished product is assigned.

The following equations may be used to calculate the component quantities and scrap values within an activity. For example, the activity scrap (A) 116 may be calculated using the following equation:

$$A = \frac{M_G * A_A \%}{100\% - A_A \%}$$

where A represents the scrap quantity, $M_G$ represents yield, and $A_A\%$ represents the activity scrap percentage. Next, the resultant component quantity (activity yield+activity scrap+fixed resource scrap) may be taken as the yield for calculating component scrap. For example, the following equation may be used to calculate total component quantity for an activity:

$$M_B = M_G + \frac{M_G * A_A \%}{100\% - A_A \%} + \ldots A_{fR} + \left(M_G + \frac{M_G * A_A \%}{100\% - A_A \%} + A_{fR}\right) * A_K \% / (100\% - A_K \%)$$

where $M_B$ represents a total production quantity or procurement quantity, $A_{fR}$ represents a fixed resource scrap percentage, and $A_K$ represents a component scrap percentage.

The variable duration of an activity can also be calculated. Activity scrap and fixed resource scrap may be used to calculate the variable duration of an activity as well as the capacity consumption for the activity. To calculate the variable duration (T), the system 100 may use the following equation:

$$T = \left(M_G + \frac{M_G * A_A\%}{100\% - A_A\%} + A_{fR}\right) * t_a$$

where $M_G$ represents yield, $A_A\%$ represents the activity scrap percentage, $t_a$ represents a total time to produce one unit, and $A_{fR}$ represents fixed resource scrap.

In scrap calculations, the quantity units of measure in which the product is being produced are noted and considered. For example, for some units of measure, such as pieces or bottles, fractions may not be recorded or produced. Similarly, some production points have rules requiring larger units such as pallets or cardboard boxes, rather than singular units. In such cases, the production planning module 126 may round up the quantities to be produced to the nearest full unit. In some embodiments, the quantities may not be rounded up until all component quantities across the production process have been calculated to avoid passing rounding difference from activity to activity.

In some embodiments, the various scrap types may impact component quantities and processing time of the activities. For example, the activity scrap 116 may raise a component requirement and a total quantity undergoing processing. Activity scrap 116 may also raise the total time for an activity and activity consumption. Similarly, fixed resource scrap 118 may raise the component quantity and total quantity undergoing processing. The fixed resource scrap 118 may also raise the time required for the activity and resource consumption. Both the activity scrap 116 and the fixed resource scrap 118 may raise an output quantity of a preceding activity when there is a material flow. In a similar fashion, the component scrap 120 may raise the component requirement.

Figure 4A:
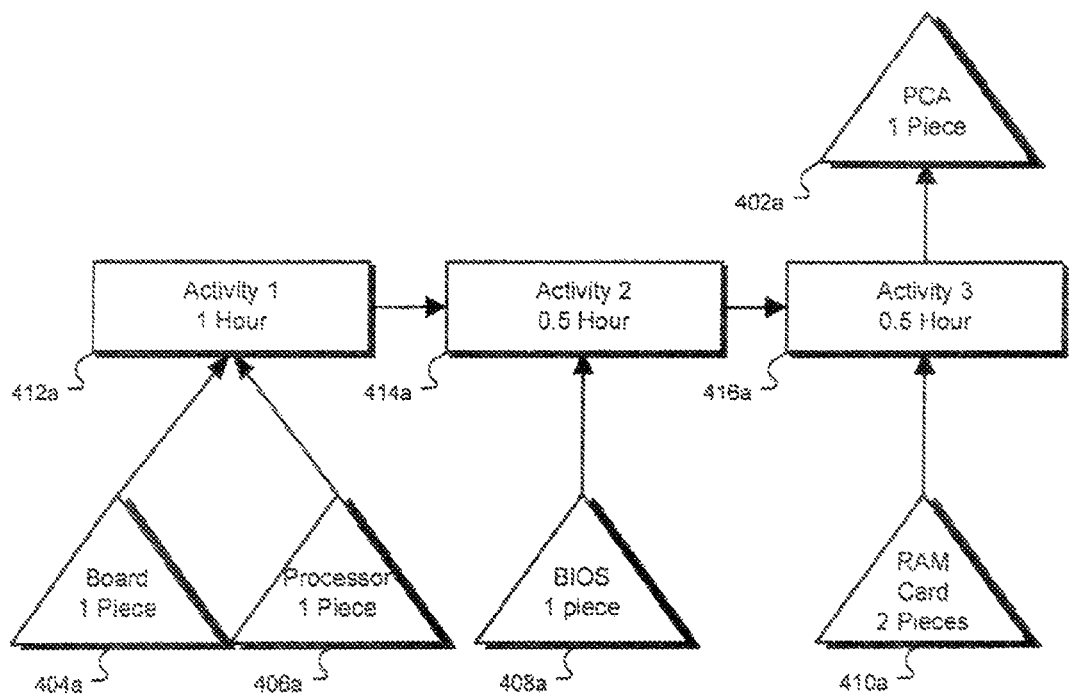
FIGS. 4A and 4B illustrate an example scrap assignment in a production scenario in accordance with one embodiment of the system in FIG. 1.
Figure 4B:
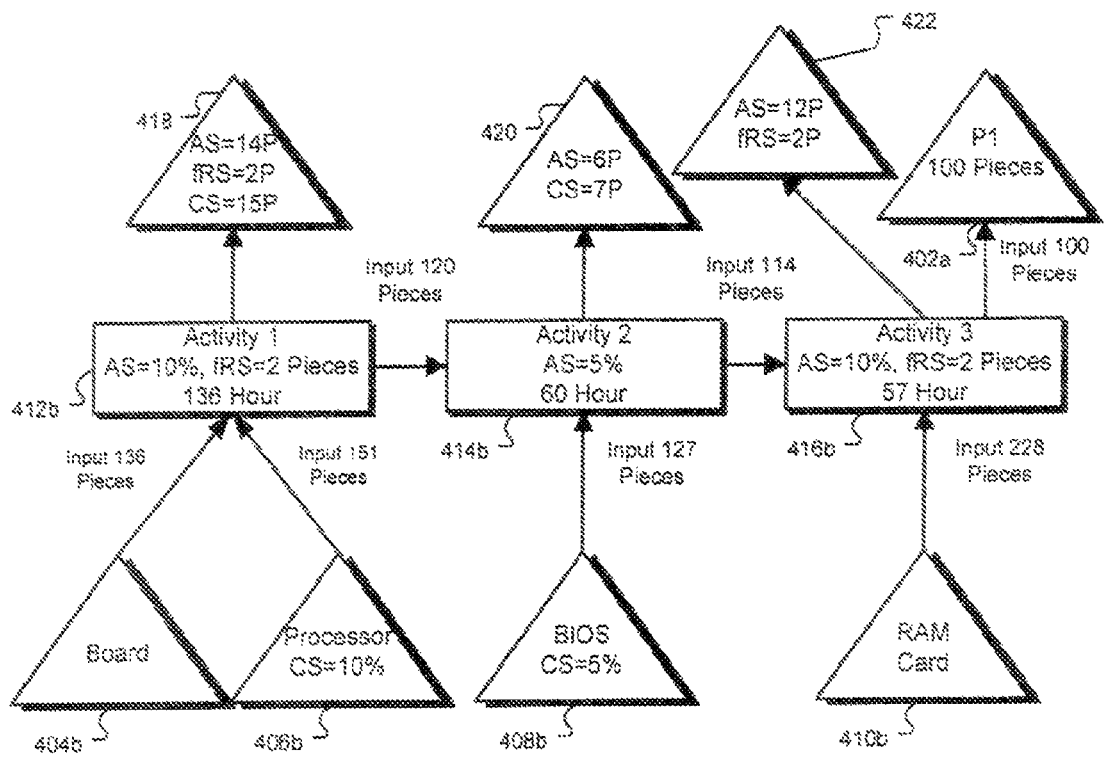

FIGS. 4A and 4B illustrate an example scrap assignment in a production scenario in accordance with one embodiment of the system in FIG. 1. Referring to FIG. 4A, a production process for a printed circuit assembly (PCA) 402 is shown. The process includes assembling one PCA 402 including a board 404, a processor 406, BIOS 408, and two RAM cards 410. A production planning order may request any number of assemblies 402 to be produced. In this example, the production planning order requests 100 pieces of the PCA 402. Each PCA 402 is produced in three consecutive activities. In a first activity 412, which has the duration of one hour, a board may be populated with the processor. In a second activity 414, which has the duration of half-an-hour, the BIOS may be installed. In a third activity 416, which has the duration of half-an-hour, the two RAM cards can be mounted. The system 100 may receive or retrieve predefined scrap percentages for the component scrap, resource scrap and activity scrap. For example, the system 100 may perform a "scrap check" to retrieve typical scrap percentage values from the master planning business object 112. The scrap check may include converting a unit of measure for the fixed resource scrap 118 if the scrap 118 unit of measure does not match a unit of measure of the particular component for that activity. In other cases, the bill of material for the PCA 402 may include the scrap percentages. For example, the bill of material for PCA 402 may include a 10% component scrap 120 for the processor and a 5% scrap value for the BIOS. In some embodiments, the component scrap value 120 may be identified from the material master object 114 if this particular bill of material does not store the component scrap. Further, resource scrap for the first activity and third activity may be set to two pieces and activity scrap may be assigned to 10% for the first activity 412, 5% for the second activity 414, and 10% for the third activity 416.

FIG. 4B illustrates the scrap calculations and resulting scrap information for the above example. Specifically, the illustration depicts the time and material requirement calculations performed by production planning module 126. In this example, 136 pieces of board 404b and 151 pieces of processor 406b are shown as input for a first activity 412b. With activity scrap percentage at 10%, fixed resource scrap at 2 pieces, and duration of 1 hour per 136 units (e.g., 136 hour total duration), the scrap calculations can be performed. In particular, the production planning module may calculate the activity scrap 120. Here, the module 126 implements the first equation above to determine the scrap value such that a precise number of pieces can be requested for input to create 100 pieces of PCA 402. In other words, the scrap expectation is predetermined such that enough parts including expected scrap may be requested for a 100 piece order. The scrap calculations 418 for activity one (404b and 406b) and the calculations 420 for activity two 408b are carried through to population of RAM cards 410b in activity three 416b where the scrap 422 can be outputted in the system as well as the 100 pieces of product 402a. The scrap values are determined per activity and can affect subsequent activities. The calculation of requirements may occur before, during, or after an activity. For example, each requirement for each activity can be calculated during activity processing. As such, in addition to calculating requirements for the activities, the system 100 may perform scrap checks to determine whether more materials or resources are requested for any or all activities.

In this example, the first activity 412b creates 14 pieces of activity scrap 116, 2 pieces of fixed resource scrap 118, and 15 pieces of component scrap 120. The yield output is 120 pieces into the second activity 414b. The second activity 414b creates 6 pieces of activity scrap 116, and 7 pieces of component scrap 120. The yield output is 114 pieces into the third activity 416b. The third activity creates 12 pieces of activity scrap 116 and 2 pieces of resource scrap 118. The yield output is 100 pieces and the production order requested is fulfilled. Although, the production quantity and activity duration calculations are not depicted in FIG. 4B, one or more of the above equations can be used in this example to calculate the total production quantity and activity durations, respectively.

Figure 5:
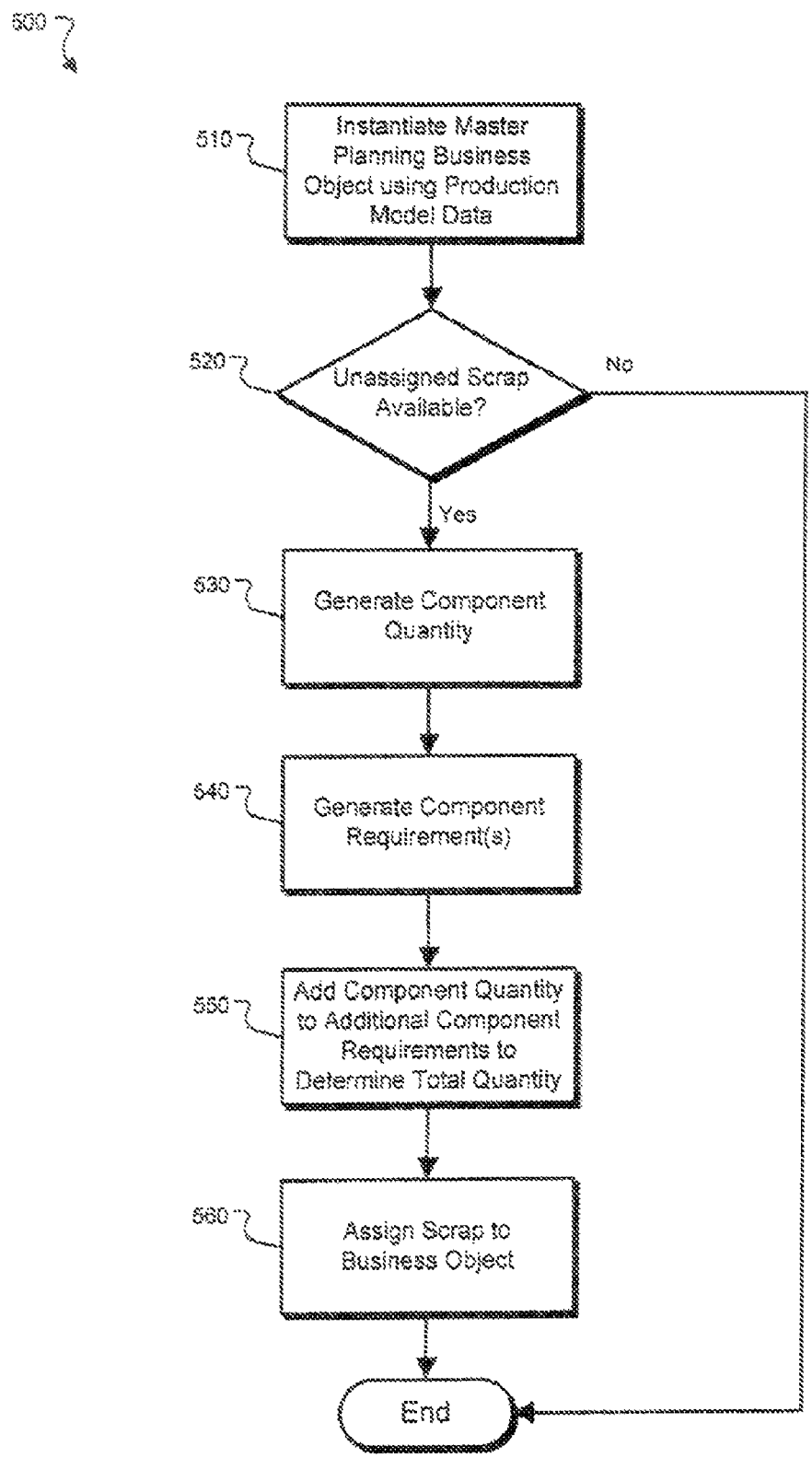
FIG. 5 illustrates an example process implementing scrap information management techniques and components in accordance with one embodiment of the system in FIG. 1.

FIG. 5 illustrates an example method (or process) 500 describing scrap information management techniques and components in accordance with one embodiment of the system in FIG. 1. For example, such a process may be implemented by the business application 124 or, more specifically, the production planning module 126. Regardless of the particular hardware or software architecture used, method 500 is generally capable of calculating and managing scrap quantities based on a production planning model. The following description of the flowchart illustrating method 500 focuses on the operation of the production planning module 126, or its components or sub-modules, in performing one of their respective methods or processes. But system 100 contemplates using any appropriate combination and arrangement of logical elements implementing some or all of the described functionality. At a high level, method 500 can be performed before, during, or after a production order has commenced. In fact, method 500 may be performed several times throughout the activities in the production order.

In operation, the master planning business object 112 is instantiated using some portion of production model data (operation 510). For example, a user may create a production order and enter GUI 130 to plan the order. The creation of the production order may instantiate the business object 112. The production order may include one or more bills of material, any or all of which may include activities. The activities can create scrap that may undergo assignment to a particular business object. As such, the system 100 may perform a check to determine the unassigned scrap levels at various points in the activities (operation 520). If unassigned scrap is not found, the method 500 may end and be performed again upon instantiation of master planning business object 112. But if unassigned scrap is found in the system 100, then the production planning module 126 may generate a component quantity (operation 530). For example, the module 126 may implement calculations similar to the equations described above to combine activity yield with activity scrap 116 and fixed resource scrap 118 to generate a component quantity.

Next, the production planning module 126 may multiply the component quantity calculated above and the component scrap ratio to generate additional component requirements (operation 540). For example, the additional component requirements may include the duration of the activity. Accordingly, the duration of the activity can be calculated by multiplying the component quantity and the duration per component. Other requirement calculations are possible.

Upon determining further requirements (e.g., scrap information), the production planning module 126 may add the component quantity to the additional component requirements to determine a new total quantity (operation 550). For example, more components can be added to the production order if the scrap values increase during production of the order. Upon calculating the further requirements, the scrap determined may be assigned to the appropriate business object (operation 560). For example, if the new requirement was created from an activity, the scrap for the requirement can be assigned to the activity business object. Similarly, if the scrap is created from the requirement of more components, the scrap can be assigned to the bill of material business object or the material business object. Once calculated, this logically centralized scrap information may be used to develop a production planning model.

The preceding flowchart and accompanying description illustrate exemplary method 500. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate. In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. Software for determining a level of scrap in a business application, the software embodied on non-transitory computer-readable media and comprising computer readable instructions operable when executed to:
   instantiate a logically centralized master planning business object using production model data for an activity; and
   calculate requirements for a production planning model using the master planning business object and scrap information, wherein calculating requirements for the production planning model using the master planning business object and scrap information includes:
   identifying an existence of unassigned scrap levels associated with the activity based on the scrap information, where the scrap information includes at least one of activity scrap, fixed resource scrap, and component scrap; and
   generating a set of scrap-related information associated with the unassigned scrap levels associated with the activity, where generating the set of scrap-related information includes calculating at least an activity scrap quantity and a total component quantity for the activity based, at least in part, on the following equations:

$$A = \frac{M_G * A_A\%}{100\% - A_A\%},$$

where A represents an activity scrap quantity, $M_G$ represents yield, and $A_A\%$ represents the activity scrap percentage, and $$M_B = M_G + \frac{M_G * A_A\%}{100\% - A_A\%} + \ldots A_{fR} + \left(M_G + \frac{M_G * A_A\%}{100\% - A_A\%} + A_{fR}\right) * A_K\% / (100\% - A_{k\%}),$$

where $M_B$ represents a total component quantity, $A_{fr}$ represents a fixed resource scrap percentage and $A_k$ represents a component scrap percentage.

2. The software of claim 1, the requirements comprising an overall total quantity for the activity and the calculation comprising:
   multiplying the total component quantity and the component scrap ratio to generate an additional component requirement; and
   adding the total component quantity to the additional component requirement to determine the overall total quantity.

3. The software of claim 2, the requirement further comprising duration of the activity and the software further operable to calculate the duration by multiplying component quantity and the duration per component.

4. The software of claim 1 further operable to perform one or more scrap checks during initialization of the master planning business object, each scrap check operable to identify unassigned scrap levels associated with the activity.

5. The software of claim 4, the scrap check comprising identifying the component scrap from a material master object if a particular bill of material object does not store the component scrap.

6. The software of claim 4, the scrap check comprising converting a unit of measure for the fixed resource scrap if the fixed resource scrap unit of measure does not match a unit of measure of the particular component for the activity.

7. The software of claim 1, the activity comprising a first activity and the software further operable to calculate the requirements for a process including the first activity and a second activity.

8. The software of claim 7, the calculation of the requirements for the process comprising calculating each requirement for each activity beginning later in the process.

9. The software of claim 1 further operable to interact with a plurality of clients operating in heterogeneous environments.

10. A system for determining a level of scrap in a business application comprising:
    memory storing a business application;
    one or more processors operable to:
        instantiate a logically centralized master planning business object using production model data for an activity; and
        calculate requirements for a production planning model using the master planning business object and scrap information for the business application, wherein calculating requirements for the production planning model using the master planning business object and scrap information includes:
            identifying an existence of unassigned scrap levels associated with the activity based on the scrap information, where the scrap information includes at least one of activity scrap, fixed resource scrap, and component scrap; and
            generating a set of scrap-related information associated with the unassigned scrap levels associated with the activity, where generating the set of scrap-related information includes calculating at least an activity scrap quantity and a total component quantity for the activity based, at least in part, on the following equations:

$$A = \frac{M_G * A_A\%}{100\% - A_A\%},$$

where A represents an activity scrap quantity, $M_G$ represents yield, and $A_A\%$, represents the activity scrap percentage, and $$M_B = M_G + \frac{M_G * A_A\%}{100\% - A_A\%} + \ldots A_{fR} + \left(M_G + \frac{M_G * A_A\%}{100\% - A_A\%} + A_{fR}\right) * A_K\% / (100\% - A_k\%),$$

where $M_B$ represents a total component quantity, $A_{fr}$ represents a fixed resource scrap percentage, and $A_K$ represents a component scrap percentage.

11. The system of claim 10, the requirements comprising an overall total quantity for the activity and the calculation comprising:
    multiplying the total component quantity and the component scrap ratio to generate an additional component requirement; and
    adding the total component quantity to the additional component requirements to determine the overall total quantity.

12. The system of claim 11, the requirement further comprising duration of the activity and the one or more processors further operable to calculate the duration by multiplying component quantity and the duration per component.

13. The system of claim 10, the one or more processors further operable to perform one or more scrap checks during initialization of the master planning business object, each scrap check operable to identify unassigned scrap levels associated with the activity.

14. The system of claim 13, the scrap check comprising identifying the component scrap from a material master object if a particular bill of material object does not store the component scrap.

15. The system of claim 13, the scrap check comprising converting a unit of measure for the fixed resource scrap if the fixed resource scrap unit of measure does not match a unit of measure of the particular component for the activity.

16. The system of claim 10, the activity comprising a first activity and the one or more processors further operable to calculate the requirements for a process including the first activity and a second activity.

17. The system of claim 16, the calculation of the requirements for the process comprising calculating each requirement for each activity beginning later in the process.

18. The system of claim 11, the one or more processors further operable to interact with a plurality of clients operating in heterogeneous environments.

* * * * *